Figure 2:
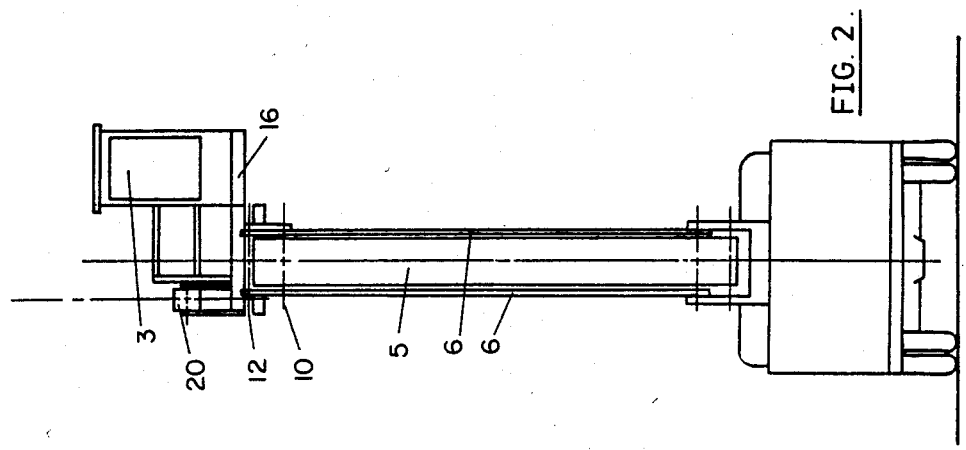

United States Patent [19]

Vestergaard

[11] Patent Number: 4,565,321

[45] Date of Patent: Jan. 21, 1986

[54] VEHICLE FOR DEICING AIRCRAFT

[76] Inventor: Godtfred Vestergaard, 18, Niels Frederiksensvej, DK-4000 Roskilde, Kornerup, Denmark

[21] Appl. No.: 537,376

[22] PCT Filed: Dec. 8, 1982

[86] PCT No.: PCT/DK82/00109
§ 371 Date: Dec. 16, 1983
§ 102(e) Date: Dec. 16, 1983

[87] PCT Pub. No.: WO83/02100
PCT Pub. Date: Jun. 23, 1983

[30] Foreign Application Priority Data
Dec. 8, 1981 [DK] Denmark .............................. 5432/81

[51] Int. Cl.$^4$ ............................................. B05B 9/00
[52] U.S. Cl. .................................. 239/172; 239/176; 239/456; 239/587
[58] Field of Search ............... 239/146, 159, 160, 162, 239/164–166, 172, 176, 178, 187, 456–459, 587; 169/24; 182/2, 51; 244/134 C

[56] References Cited

U.S. PATENT DOCUMENTS

| 2,711,929 | 6/1955 | Nielsen | 239/456 |
| 3,010,533 | 11/1961 | Ross | 182/51 X |
| 3,074,649 | 1/1963 | Atkinson | 239/165 |
| 3,153,510 | 10/1964 | Brannfors et al. | 239/172 X |
| 3,243,123 | 3/1966 | Inghram et al. | 239/165 X |
| 3,531,054 | 9/1970 | Pulk | 239/587 |
| 3,599,722 | 8/1971 | Davidson et al. | 169/24 |
| 4,007,793 | 2/1977 | Hux et al. | 239/172 X |

FOREIGN PATENT DOCUMENTS 2724515 12/1977 Fed. Rep. of Germany ...... 239/165

Primary Examiner—Johnny D. Cherry
Attorney, Agent, or Firm—Silverman, Cass & Singer

[57] ABSTRACT

A vehicle for deicing aircraft comprises an undercarriage (1) having a lifting device (4,5,6,7) carrying a closed operation cabin (3). The vehicle includes a spray device for applying spray fluid to the aircraft, and this spray device comprises a pump and a connected spray nozzle. To avoid frequent adjustments of the position of the carriage and to allow spray operations close to the areas to be sprayed, the spray nozzle is supported on a longitudinally adjustable lightweight boom (20) carried by the cabin (3). The cabin (3) is further pivotally supported by a turntable construction (15,16) relative to the carriage (1). The nozzle is also connected to remote control devices in the cabin (3) for pivotal movement of the nozzle about two axes extending perpendicular to each other. The two pivot axes are appropriately intersecting in a point coinciding with the direction of the jet from the nozzle.

10 Claims, 8 Drawing Figures

V-V

VEHICLE FOR DEICING AIRCRAFT

The invention relates to a vehicle for deicing aircraft and of the type comprising an undercarriage having a lifting device which at its free end carries an operation platform, and having a spray device for spraying an aircraft with a deicing fluid, said spray device comprising a pump and an associated spray nozzle.

In the conventional vehicles of this type the operation platform is a basket and the person spraying the aircraft stands in the basket and carries the spray nozzle which is manually directed to the areas of the aircraft to be sprayed. This prior art has the disadvantage that the operator is exposed to the recoil from the spray nozzle and as the range of the nozzle further is very limited, frequent shifting of the carriage carrying the operation platform is required.

The deicing equipment according to the present invention is characteristic in that the lifting device is adapted for elevating and lowering so as to retain the centre of gravity of the total mass of the equipment within the area determined by the wheels of the carriage, that the operation platform is designed as a closed protective cabin pivotally supported in a horizontally orientated plane, that the cabin structure carries a longitudinally adjustable lightweight boom carrying at its free end the spray nozzle, and that the nozzle is connected to means remote-controlled from the cabin for pivotal movement of the nozzle about two axes extending perpendicular to each other. This provides a vehicle that far easier and less manpower requiring than the hitherto known vehicles, combined with a substantially improved possibility for operational observation and an effective protection of the operator, allows spraying of even large parts of an aircraft without necessitating shifting of the carriage as the lightweight boom due to its longitudinal adjustability may be moved close to the respective parts of the aircraft even if they are located far apart, and due to the double pivotal movability of the nozzle, spraying is possible of upwardly and downwardly extending surfaces as well as laterally extending surfaces of the aircraft.

With a view to further increasing the range of the vehicle, the lightweight boom may according to an embodiment of the invention be pivotally supported in the vertical direction relative to the operation platform, and the lifting device may be a parallelogram linkage.

It is particularly advantageous if the two axes about which the nozzle is pivotal are intersecting at a point located in the longitudinal axis of the spray direction of the nozzle as it is thereby obtainable that the reactive forces provided by the jet ejected from the nozzle will impart no torque to the spray nozzle.

Figure 1:
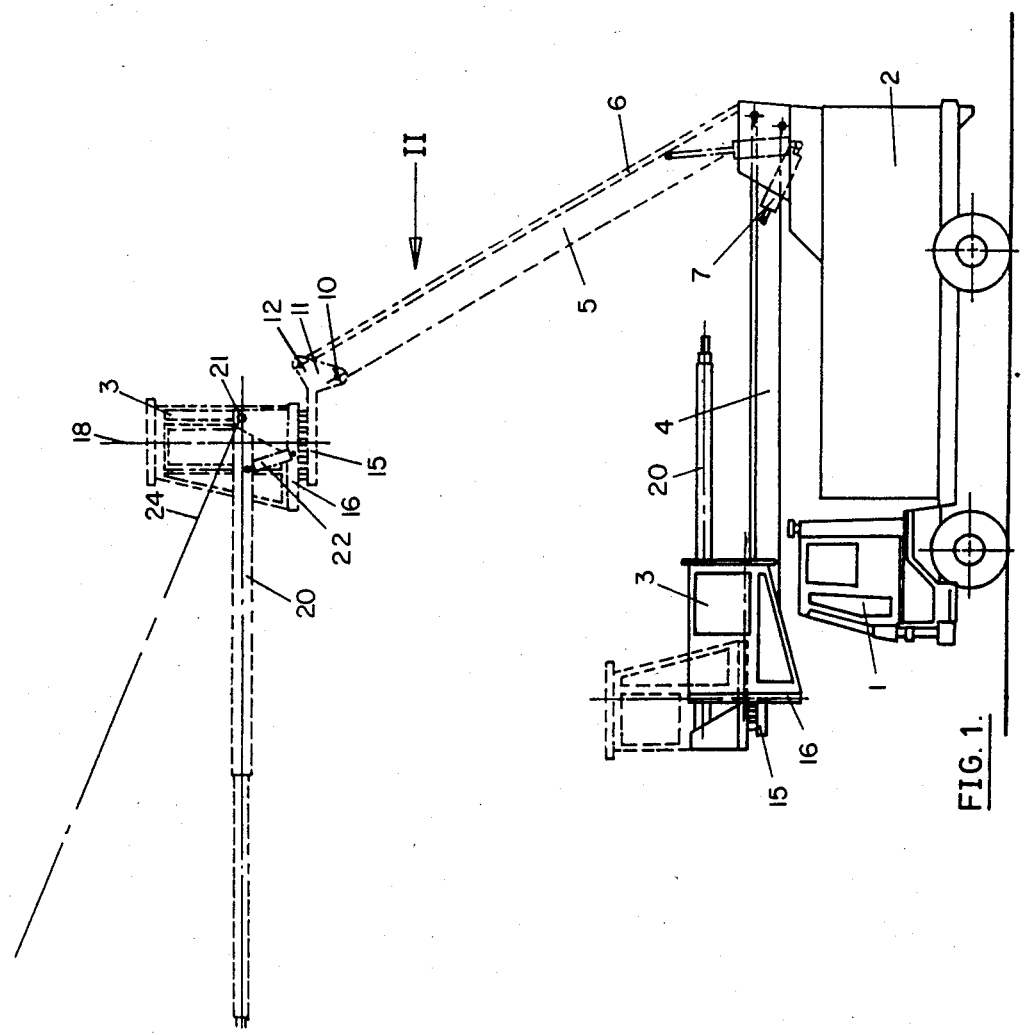
Figure 3:
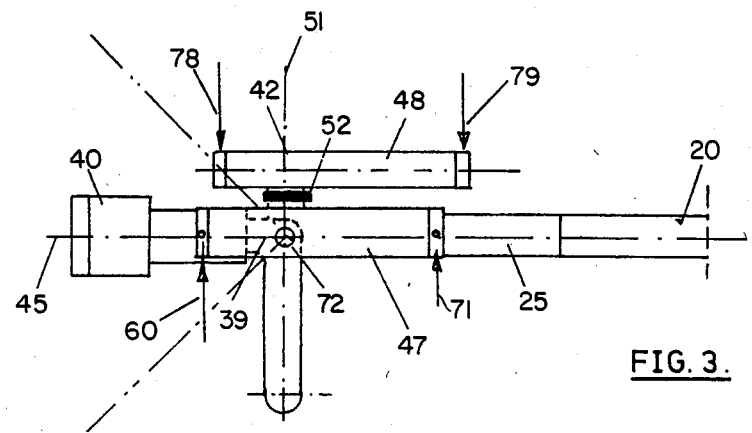
Figure 4:
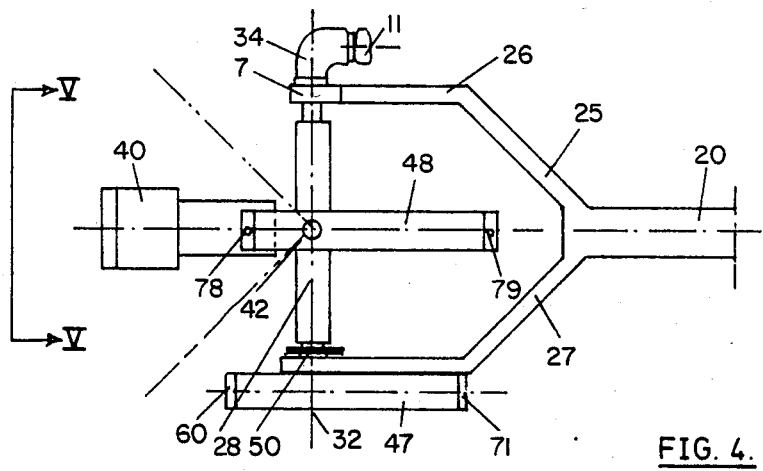
Figure 5:
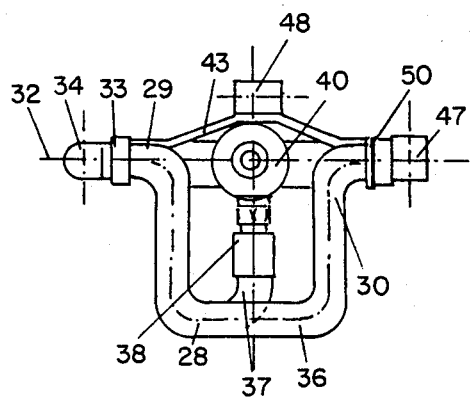
Figure 7:
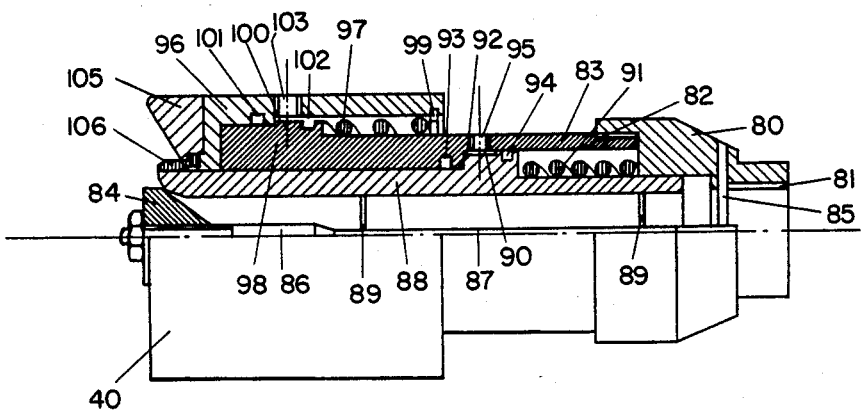
Figure 6:
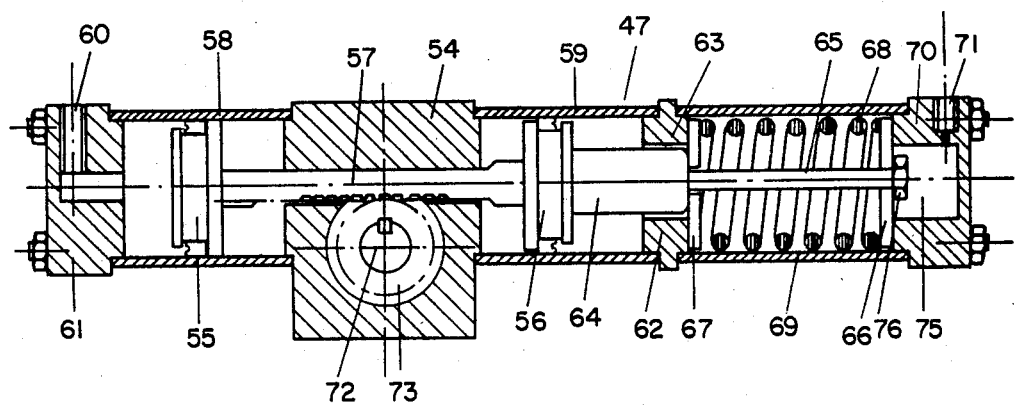
Figure 8:
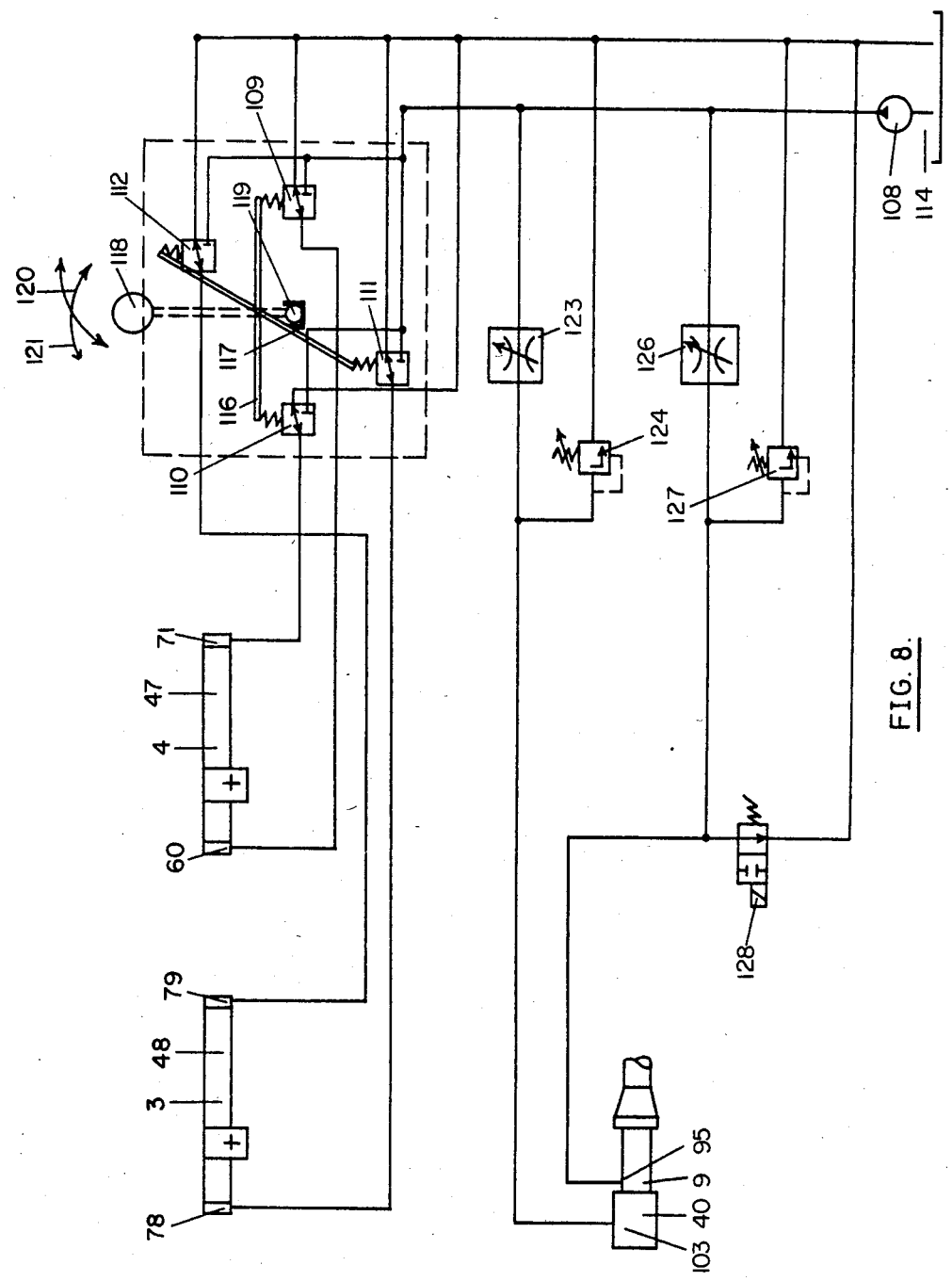

The invention will be explained in detail below with reference to the drawing in which FIG. 1 is a side elevational view of an embodiment of the deicing equipment according to the invention, FIG. 2 is the equipment of FIG. 1 seen in direction of arrow II in FIG. 1, FIG. 3 is a side elevational view of a nozzle means for the equipment of FIG. 1, FIG. 4 is a plan view of the nozzle means of FIG. 3, FIG. 5 is the nozzle means of FIG. 3 seen in direction of arrow V—V in FIG. 4, FIG. 6 is an activator for the nozzle means of FIG. 3, FIG. 7 is a side elevational view, partially in cross section, of an embodiment of a nozzle for the nozzle means of FIG. 3, and FIG. 8 is an illustration of a hydraulic plan for controlling the nozzle arrangement and the nozzle according to the invention.

In the drawing numeral 1 denotes a motor vehicle carrying on its chassis various equipment including two tanks 2 for spray fluid. The chassis supports an operation platform in the form of a closed protective cabin 3 connected to the chassis by means of a parallelogram linkage 4. The latter comprises a heavy main boom 5 on either side of which a parallel control lever 6 is disposed. A hydraulic cylinder 7 is disposed between the main boom 5 and the rear end of the vehicle 1, and by extension of said cylinder drive the cabin 3 is moved between the two positions shown in FIG. 1. The boom 5 is at one end pivotally connected to a support on the cabin 3 and by means of a strong bolt 10 pivotally connected to a forked lever 11 to which the parallel guide rods 6 are also connected by means of a bolt 12.

The forked lever 11 carries the bottom portion 15 of a turntable construction whose upper portion 16 carries the closed protective cabin 3 itself. From the aforegoing it will be understood that the protective cabin 3 when moving between the two positions shown in FIG. 1 will be moved parallel to itself and that due to the turntable construction the cabin 3 may further be pivotal about the vertical axis 18 thereof. Moreover, the upper portion 16 is pivotally connected to the bottom portion 15 of the turntable construction so that the cabin 3 can be turned over, e.g. by hydraulic means, from an upright operation position (FIG. 1 dotted lines) to a lowered position (FIG. 1 full lines), and vice versa.

The protective cabin 3 carries a longitudinally adjustable lightweight boom 20 which is pivotally connected to the upper part of the turntable construction by means of a bolt 21, and which is pivotal about the latter by means of a hydraulic cylinder 22. Thus, the lightweight boom 20 is pivotal between the horizontal position shown in FIG. 1 and an elevated position indicated by a dash-dot line 24.

The end of the lightweight boom 20 carries a nozzle arrangement which for the sake of simplicity is omitted in FIG. 1 but shown in FIGS. 3, 4 and 5. As shown in FIG. 4 a fork 25 having two parallel fork arms 26 and 27 is secured to the telescopically formed boom 20. In said arms a U-formed yoke 28 is pivoted, the shape of which clearly appears from FIG. 5. The yoke has outwardly extending ends 29 and 30, and the pivot axis defined by the suspension of the yoke in the fork is denoted 32. In the embodiment shown in the drawing the yoke 28 is hollow, and its end 29 is through a swivel 33 coupled to a hose 34 which by means of a hose (not shown) is connected to the tank means 2 on the car 1 via spray pumps (not shown).

From the bottom 36 of the yoke 28 a stud 37 carrying a swivel 38 is branched off. Said swivel is by means of a bend 39 connected to the rear end of a nozzle 40. To the upper surface of the bend 39 is attached a journal 42 pivotally secured in a bridge piece 43 which is fastened between the arms of the yoke 28. The axis of the journal 42 is perpendicular to the pivot axis 32 of the yoke which it intersects in a point located in the longitudinal axis 45 of the nozzle 40.

From the above description it will be understood that the nozzle 40 is pivotal in a vertical plane by pivotal movement of the yoke 28 about the axis 32, and the nozzle is further pivotal in a horizontal plane, i.e. by pivotal movement about the journal 42 extending axially aligned with the swivel 38. This implies at the same time that the force of a jet ejected from the nozzle 40 will not activate—turn—the nozzle itself.

In order to provide the two pivotal movements mentioned above, the nozzle arrangement has two hydraulic activators 47 and 48. The activator 47 serves to pivot the yoke 28 about the axis 32 and is connected to one end 30 of the yoke through a flexible coupling 50. The second activator 48 serves to pivot the nozzle about an axis 51 defined by the swivel 38 and the journal 42, the activator 48 through a flexible coupling 52 being connected to the journal 42.

The two activators 47 and 48 being identical, it will be sufficient to explain one of them in detail, and in this connection reference is made to FIG. 6.

The activator 47 shown in FIG. 6 comprises a housing 54 within which is displaceably positioned a double piston construction consisting of two pistons 55, 56 interconnected by a rack 57. The two pistons 55, 56 are displaceably positioned in their respective cylinders 58, 59, one of which 58 being closed by an end cover 61 having a pressure inlet 60 so as to pressurize one side of the piston construction 55, 56. The second cylinder 59 has at one end an intermediate wall 62 having a hole 63 receiving one end of a spacing pipe 64 in the inactive position of the activator as shown in FIG. 6. The spacing pipe 64 is connected to the piston 56 and encloses a pull rod 65 extending through a spring plate 67 and having one end connected to the piston 56 and the other end connected to a spring plate 66. A compression spring 68 is arranged around the rod 65 and between the two spring plates 66 and 67. This spring construction is disposed in an extension 69 of the cylinder 59, said extension being at its end provided with a cover 70 having a pressure inlet 71.

The activator 47 shown in FIG. 6 forces the end 30 of the yoke about the flexible coupling 50 by means of a journal 72 carrying a gear 73 engaging the rack 57. Likewise, the activator 48 drives the journal 52 connected to the feed bend 39 of the nozzle.

Either of the two activators 47 and 48 operates as follows, reference being made to FIG. 6.

When pressure is fed to the pressure inlet 60, the piston construction 55, 56 will move to the right resulting in clockwise pivotal movement of the journal 72. At the same time the end of the spacing pipe 64 will press against the spring plate 67 thereby compressing the spring 68, the opposite spring plate 66 abutting the surface of the end cover 70 and the rod 65 moving into a cavity 75 of the cover 70. When the pressure inlet 60 is relieved, the journal 72 will be returned by the spring 68 to the position shown in FIG. 6. If the pressure inlet 71 is pressurized, the pressure will be transmitted about and through the two spring plates 66 and 67 as well as the spring 68 and through the hole 63 onto the right side of the piston construction 55, 56, thus moving the rack 57 to the left in the drawing and turning the journal 72 in anti-clockwise direction. Owing to its head 76 the rod 65 will displace the spring plate 66 to the left during compression of the spring 68 with the spring plate 67 abutting the intermediate wall 62. Thus, when the pressure at the pressure inlet 71 is relieved, the spring will return the rack 57 to the position shown in FIG. 6.

The activator 47 which as mentioned controls the vertical pivotal movement of the nozzle 40 is shown in FIG. 8 with its two pressure inlets 60, 71, and FIG. 8 also shows a second activator 48 for providing the horizontal pivotal movement of the nozzle and, as it will be understood, also the latter activator has two pressure inlets 78 and 79 in FIG. 8.

The nozzle shown in FIG. 7 comprises a screwed connection 80 having an inside thread 81 for screwing the nozzle onto the bend 39. By means of a thread 82 a main pipe 83 is firmly connected to the screwed connection 80 to which further a valve body is fixed by means of a screw 85. The valve body 84 is connected with the screw 85 by a valve shaft comprising an annular portion 86 and a flat portion 87. About the valve shaft 86, 87 an inner pipe 88 is displaceably arranged within the main pipe 83, and the valve shaft is guided in said inner pipe 88 due to the flat portion 87 of the valve shaft having generally the same width as the diameter of the inner pipe 88 and, furthermore, the flat portion 87 carries spacers 89 on which the pipe 88 is slidable.

The inner pipe is provided with an outside circumferential cam 90 between which and the screwed connection 80 a compression spring 91 is disposed. At the opposite side of the cam 90 a circumferential pressure chamber 92 is provided and the latter is sealed by means of two circumferential sealing rings 93 and 94 disposed in grooves at the inner surface of the main pipe 83 and the outer surface of the cam 90, respectively. To the pressure chamber 92 a pressure inlet 95 is leading.

It will then be understood that when the pressure chamber 92 is pressurized, the inner pipe 88 will be displaced against the force of the spring 91, thereby causing the left end of the inner pipe 88 to release its engagement with the valve body 84 so as to allow discharge of spray fluid.

A sleeve 96 is disposed about the main pipe 83. Said sleeve is displaceably arranged on the main pipe 83 in the left hand direction in FIG. 7 against the force of a spring 97 disposed about the main pipe 83 and having one end abutting a cam 98 thereon and the other end abutting a spring ring 99 fastened to the end of the sleeve 96.

To the left of the cam 98 is provided a circumferential pressure chamber 100 laterally sealed by two sealing rings 101 and 102. A pressure inlet 103 leads to this pressure chamber. It will thus be understood that when the pressure chamber 100 is pressurized, the bushing will be moved to the left in FIG. 7.

The end of the sleeve is formed with an outwardly expanding conical surface 105 and is further carrying a atomizer ring 106. The ring 106 is pivoted in an inside groove of the sleeve and provided with slanting or helical slots.

It will be understood from the foregoing description that as the pressure inlet 103 is pressurized the sleeve will be displaced to the left in FIG. 7 thereby causing the atomizer ring 106 to project into the jet which would otherwise be conically ejected between the end of the inner pipe 88 and the valve body 84. Thus, the conical jet will be scattered or atomized. If the sleeve is moved even farther to the left in FIG. 7, it will be apparent that its inside will protrude out of the end of the inner tube 88. The atomizing effect will then cease, and the inside of the sleeve will instead transform the otherwise conical jet into a generally cylindrical jet.

The nozzle 40 is shown schematically in FIG. 8 with the two pressure inlets 95 and 103.

As will appear from FIG. 8, the four activator pressure inlets 60, 71, 78 and 79 are connected to their respective pressure control valves 109, 110, 111 and 112.

Each valve is connected to the pressure side of a hydraulic pump 108 as well as to a reservoir 114. The lines connecting the four valves with the reservoir 114 are thus without excess pressure.

Each pressure control valve 109, 110, 111 and 112 is formed as known per se so that only their operation needs further explanation. Each of the valves will in its inactive position block the circulation through itself. As the valves, however, are actuated by their operational means they will gradually open for passage of hydraulic fluid, and the fluid passing will initially have a relatively small pressure due to the throttling occurring at initiated opening. As opening increases, the pressure will rise owing to decreasing throttling and it will therefore be understood that the subject valves are able to feed the respective pressure inlets with a continuously variable increasing pressure. As mentioned, the valves are provided with springs which implies that nothing happens if they are actuated in a direction opposite to the opening direction, and the respective pressure inlet will thus not be fed.

As will appear from FIG. 8, the two pressure control valves 109 and 110 of the activator 47 are interconnected by a rod 116, and the two valves 111 and 112 of the activator 48 are also interconnected by a rod 117. The two rods 116 and 117 form a cross and are rigidly interconnected, and to this cross is secured a hand grip 118 which by means of a ball 119 is versatilely pivoted in the cabin 3 and thus operationable by an operator seated in the cabin.

From the explanation above it will be understood that if the hand grip 118 is pivoted in direction of arrow 120, the rod 116 will activate the valve 109 in direction for opening. The pressure inlet 60 to the activator 47 will then be pressurized. The valve 110 will not be actuated and will thus allow passage from the pressure inlet 71 of the activator 47 to the reservoir 114. In other words, this will result in the piston construction 55, 56 in FIG. 6 being moved to the right, and the nozzle 40 will be moved to one side in horizontal direction. If, however, the hand grip 118 is moved in direction of arrow 121, the nozzle will be moved in the opposite direction. It will further be understood that if the hand grip 118 is pivoted perpendicularly to the direction of arrows 120, 121, the two pressure control valves 111 and 112 will be controlled, thereby causing the activator 48 to pivot the nozzle in a vertical plane. It will also be understood that when the hand grip 118 is pivoted in an arbitrary other direction, a combined movement of the nozzle will occur, namely a combination of a pivotal movement about the horizontal and the vertical axis 32 and 51, respectively.

FIG. 8 also shows how the jet form control sleeve 96 is controlled by variation of the pressure to the pressure chamber 100 through the pressure inlet 103. The inlet 103 is coupled to the hydraulic pump 108 through a flow control valve 123 and in front of it a drain line is branched off in which a pressure control valve 124 is inserted, said branch leading to the reservoir 114. It will be understood that the pressure chamber 100 is not to be fed with any particularly large amount but only to the extent of its volume increase during the control, whereas the very pressure is of great importance. By means of the flow control valve 123 which is adjustable and formed as known per se, a relatively small flow is dosed through the flow control valve 123. By adjusting the resistance more or less by the pressure control valve 124, the latter will throttle the pressure through the flow control valve 123 more or less. By extreme throttling, i.e. when the valve 124 is almost closed, the pressure inlet 103 will be fed with a high pressure causing the sleeve 96 to adopt the position far left as explained above. However, as the pressure control valve is opened, it will throttle less so that the inlet pressure to the pressure inlet 103 will drop, thereby moving the sleeve continuously variably to the right in FIG. 7. In this way, a transformation of the jet form is provided as explained in the foregoing, and it will be understood that the flow control valve 123 and the pressure control valve 124 are located in the cabin 3 so as to be operated by the operator there.

The control of the opening and closing of the nozzle 40 is also illustrated in FIG. 8, from which it appears that the pressure inlet 95 is connected to the hydraulic pump 108 in the same manner as the pressure inlet 103, the pressure inlet 95 being controlled through a flow control valve 126 and a pressure control valve 127 formed and operating as described above for the flow control valve 123 and the pressure control valve 124. In other words, the pressure fed to the pressure inlet 95 may be adjusted from a high value, i.e. at extreme throttling in the valve 127, to a low value, i.e. at small throttling in the valve 127. In the latter case, the flow through the valve 127 will increase with correspondingly small resistance resulting in decrease of the pressure fed to the pressure inlet 95. From the above explanation it will be apparent that the higher the pressure fed to the pressure chamber 92, the more the inner pipe 88 will move and the larger the amount of spray fluid ejected per time unit.

To control the start and stop of the flow through the nozzle, the pressure inlet 95 is connected to the reservoir 114 through a line in which an electrically controlled off-on valve 128 is inserted. This valve is also known per se, and it is therefore only mentioned that it is normally open so as to relieve the pressure inlet 95. However, when this valve is activated in the closed position, the pressure adjusted by means of the flow control valve 126 and the pressure control valve 127 will be transmitted to the pressure inlet 95 resulting in opening. It will be understood that the valve 128 is controllable by a simple pushbutton also located in the cabin 3 for operation by the operator there.

In FIG. 8, the control system for the activators 47 and 48 is a manually operable hydraulic system. In case servo-control is installed, the said activators would be made identical at both ends, each end being provided with a piston 55, means 58 and 59 and an inlet 60 as shown in FIG. 6, the journal 72 being controlled by a potentiometer, not shown. Thus, the hand grip, i.e. 118 in FIG. 8, will correspond to potentiometer control of activator 48 in the direction of the arrow 120, and to potentiometer control of activator 47 in the direction of the arrow 121.

I claim:

1. A vehicle for deicing aircraft and of the type comprising a wheeled carriage (1) having a lifting device (4,5,6,7) which at its free end carries an operation platform, and having a spray device for spraying an aircraft with a deicing fluid, said spray device comprising a pump including a spray nozzle (40), the lifting device (4,5,6,7) being adapted for elevating and lowering so as to retain the center of gravity of the total mass of the equipment within the area determined by the wheels of the carriage, the operation platform including a closed protective cabin (3) pivotally supported on said lifting device (4,5,6,7), wherein the cabin (3) carries a longitudinally adjustable, lightweight boom (20) carrying at its free end the spray nozzle (40), said nozzle being pivotal about each of two axes extending perpendicular to each other and intersecting at a point located on the longitudinal axis of discharge from said nozzle in order to prevent displacement of the nozzle by reaction force generated by the spray discharged therefrom, said nozzle being supported for said pivotal movement about said axes by respective support means driven by respective activator means remotely controlled from said cabin.

2. Vehicle according to claim 1, wherein the lifting device (4,5,6,7) in the horizontal plane is non-pivotal relative to the carriage (1).

3. Vehicle according to claim 1 or 2, wherein the protective cabin (3) on the lifting device (4,5,6,7) is pivotally arranged for horizontal or vertical position.

4. Vehicle according to any one of the claims 1 or 2, wherein the lifting device is designed as a pivotal mast (5) formed as a parallelogram linkage (5,6) pivotal in a vertical plane.

5. Vehicle according to claim 1, wherein the end of said boom is formed by a fork (25) having arms (26,27) supporting respective outwardly extending ends (29,30) of a generally U-shaped yoke (28) defining a first of said respective support means and pivotally driven about the first of said pivotal axes (32) defined between said ends by said respective activator means carried by said fork, said nozzle (40) being connected to said yoke by a shaft (42) defining the second of said respective support means, said shaft having a longitudinal axis (51) defining the other of said pivotal axes of the nozzle, said shaft being driven by said respective activator means carried by said yoke.

6. Vehicle according to claim 5 wherein at least one end (29) of the yoke (28) is hollow and by means of a swivel (33) connected to a hose for spray fluid, and a cavity (37) in the yoke communicating with said hollow end is connected to the nozzle (40) by a swivel (38) whose pivot axis coincides with the longitudinal axis of the shaft (42) by means of which the nozzle (40) is supported relative to the yoke (28).

7. Vehicle according to claim 5, wherein at least one of the activator means (47 and 48) comprises a housing (54) within which a double piston construction (55,56) is displaceably supported and connected to a rack (57) engaging a gear (73) on the respective shaft to be pivoted, and that the piston construction (55,56) is actuated by a spring mechanism (68) which in the inactive position of the activator means (47,48) keeps a central operational area of the rack (57) aligned with the gear (73), and that the sides of either piston construction (55,56) are controllably connected to a pressure source.

8. Vehicle according to claim 7, wherein each side of said piston construction in each activator means (47,48) is connected to a valve (109,110, and 111,112 respectively), said valves being connected to the pressure source (108) and to a reservoir (114), and said valves being formed as continuously variable pressure control valves, and that the control means for the two valves (109,110, and 111, 112 respectively) are interconnected by a rod (116 and 117, respectively), said respective rods being rigidly interconnected in the middle and rigidly connected to a versatilely pivotal operation grip (118) in such a manner that pivotal movement of the grip (118) in one direction provides a proportional displacement of the piston construction (55,56) in a respective activator means (47) and pivotal movement of the grip (118) in a direction perpendicular thereto provides a proportional displacement of the piston construction in the other activator means (48).

9. Vehicle according to claim 1, wherein the nozzle (40) comprises a main pipe (83) connected to the spray pump within which main pipe (83) an inner pipe (88) is displaceably supported against the force of a spring (91), said inner pipe (88) having at its one end a seat for co-action with a valve body (84) retained relative to the main pipe (83), and that between the main pipe (83) and the inner pipe (88) there is provided a pressure chamber (92) connectable with a pressure source (108) for moving the inner pipe (88) in a direction away from the valve body (84), said main pipe (83) further having a sleeve (96) supported displaceably against the force of a spring (97) for controlling the form of the jet ejected from the nozzle (40) and between which sleeve (96) and the main pipe (83) there is provided a pressure chamber (100) connectable with the pressure source (108) for moving the sleeve relative to the said end of the main pipe, said sleeve having at its end a swivel ring (106).

10. Vehicle according to claim 9, wherein the two pressure chambers (92 and 100) are connected to the pressure source (108) through a respective adjustable flow control valve (126,123), and that between the discharge side of each flow control valve and the associated pressure chamber a line leading to the reservoir (114) is branched off, in which line is inserted a pressure control valve (127 and 124, respectively), and that the pressure chamber (92) provided between the main pipe (83) and the inner pipe (88) is connected with the reservoir (114) through an off-on valve (128).

* * * * *